US006563623B1

(12) United States Patent
Penninckx et al.

(10) Patent No.: US 6,563,623 B1
(45) Date of Patent: May 13, 2003

(54) SYSTEM FOR TRANSMITTING OPTICAL DATA

(75) Inventors: Denis Penninckx, Nozay (FR); Christophe Bridoux, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/354,820

(22) Filed: Jul. 19, 1999

(30) Foreign Application Priority Data

Jul. 20, 1998 (FR) .............................. 98 09215

(51) Int. Cl.$^7$ .............................. H04B 10/04
(52) U.S. Cl. ...................... 359/183; 359/181
(58) Field of Search ................. 359/158, 181, 359/182–186, 180; 375/239, 289

(56) References Cited

U.S. PATENT DOCUMENTS

| 5,515,196 A | * | 5/1996 | Kitajima et al. | ............. | 359/180 |
| 5,784,188 A | * | 7/1998 | Nakamura et al. | .......... | 359/248 |
| 5,917,628 A | * | 6/1999 | Ooi et al. | .................... | 359/135 |
| 5,920,416 A | * | 7/1999 | Beylat et al. | ................ | 359/181 |
| 6,002,816 A | * | 12/1999 | Penninckx et al. | ............. | 385/3 |
| 6,035,078 A | * | 3/2000 | Dagens et al. | ................. | 385/14 |
| 6,088,147 A | * | 7/2000 | Weber et al. | ................ | 359/237 |
| 6,490,044 B1 | * | 12/2002 | Koch et al. | .................. | 359/577 |

FOREIGN PATENT DOCUMENTS

EP          0 792 036 A1    8/1997

OTHER PUBLICATIONS

Penninckx D. et al.: "Experimental Verification of the Phase–Shaped Binary Transmission (PSBT) Effect", IEEE Photonics Technology Letters, vol. 10, No. 4, Apr. 1998, pp. 612–614 XP002098378.

Fukichi K. et al.: "10 Gbit/s–120 KM Standard Fiber Transmission Employing a novel Optical Phase–Encoded Intensity Modulation for Signal spectrum Compression", Conference on Optical Fiber Communications, Dallas, Feb. 16, 1997, p. 270/271 XP000776468, Institute of Electrical And Electronics Engineers.

Penninckx D. et al.: "The Phase–Shaped Binary Transmission (PSBT): A New Technique to Transmit Far Beyond the Chromatic Dispersion Limit" IEEE Photonics Technology Letters. vol. 9, No. 2, Feb. 1997, pp. 259–261, XP000683883.

* cited by examiner

*Primary Examiner*—Brent A. Swarthout
(74) *Attorney, Agent, or Firm*—Sughrue Mion, PLLC

(57) ABSTRACT

The transmission system includes a first electro-optical modulator adapted to supply in response to an input electrical signal a controlled phase optical signal having an optical power modulated between low levels and high levels and a phase shift within each time cell that contains a low power level. To make it more flexible to use, the system includes a second electro-optical modulator controlled by the input signal and optically coupled to the first electro-optical modulator to apply to said controlled phase optical signal complementary power and/or phase modulation so as respectively to modify its extinction ratio and/or to apply a transient "chirp" to it.

9 Claims, 5 Drawing Sheets

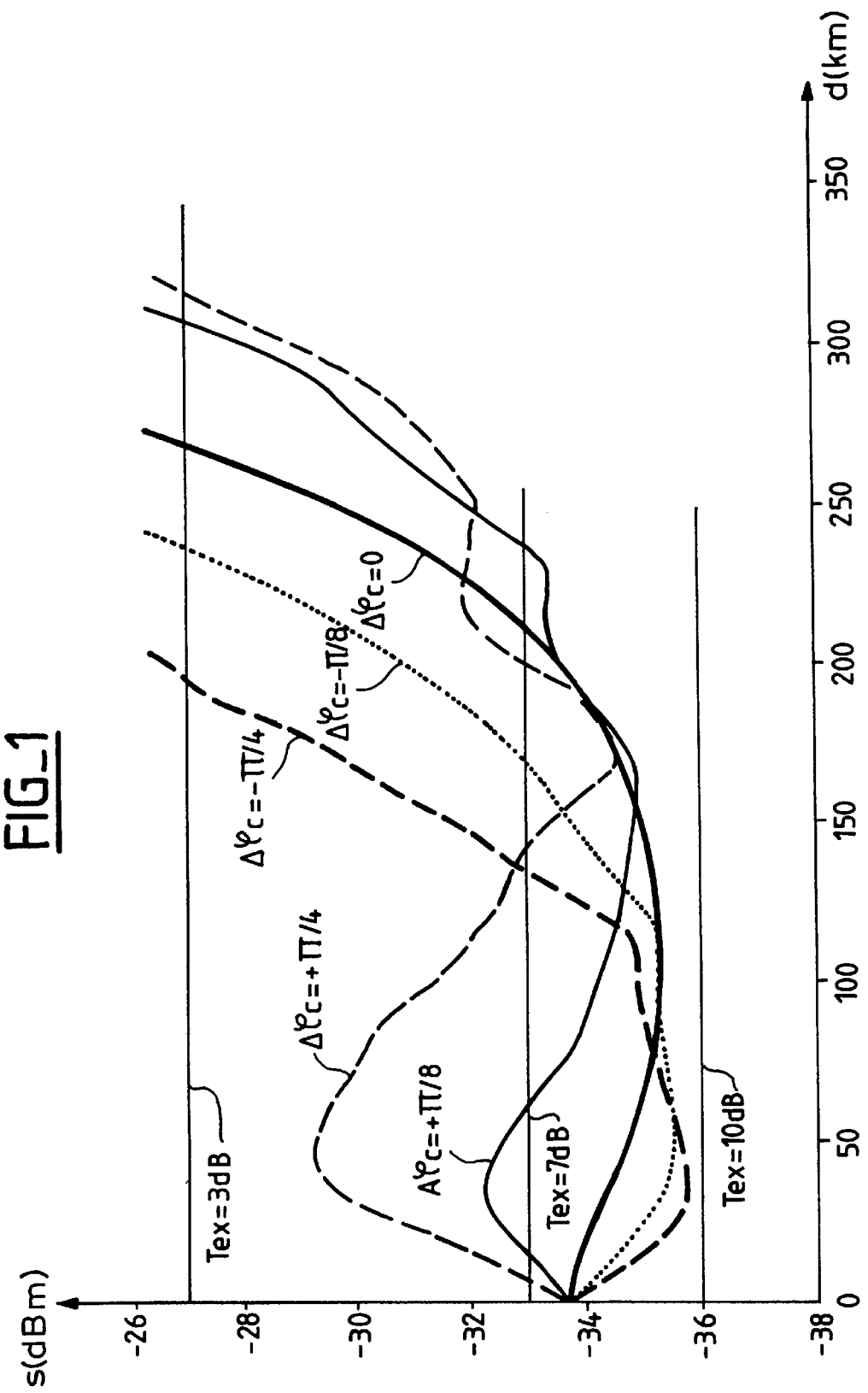

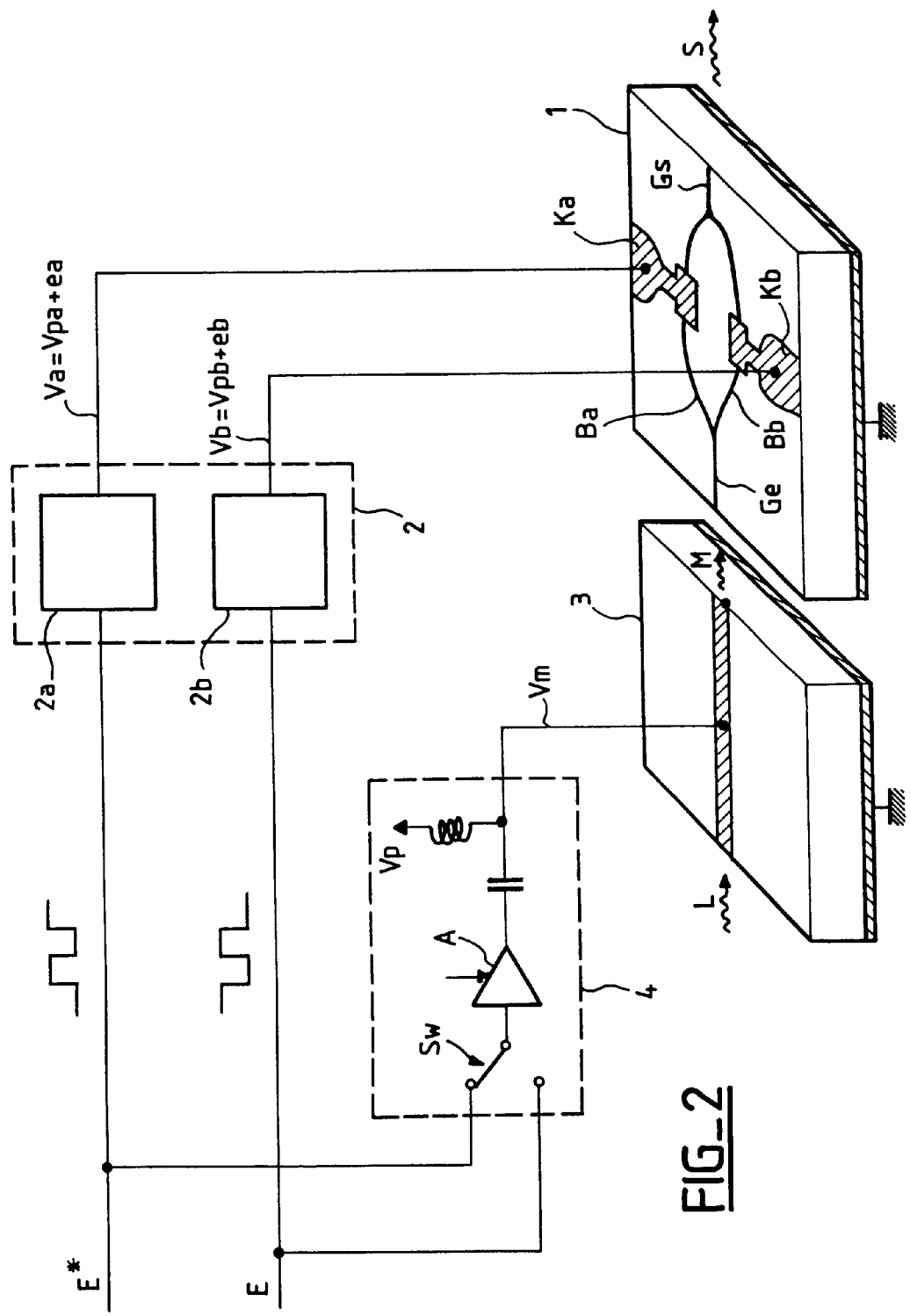
FIG_2

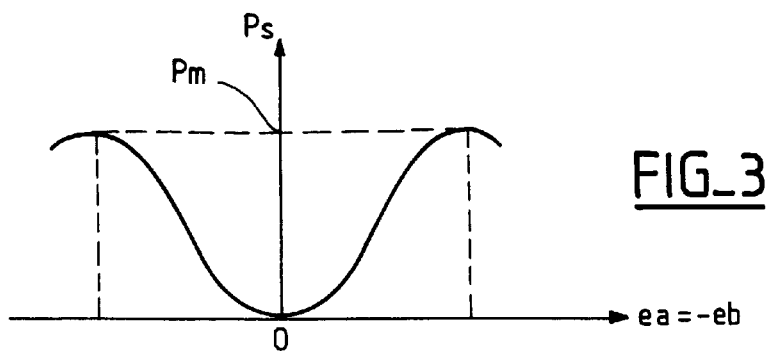
FIG_3
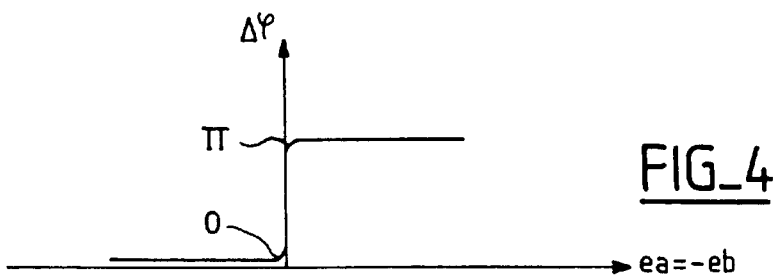
FIG_4
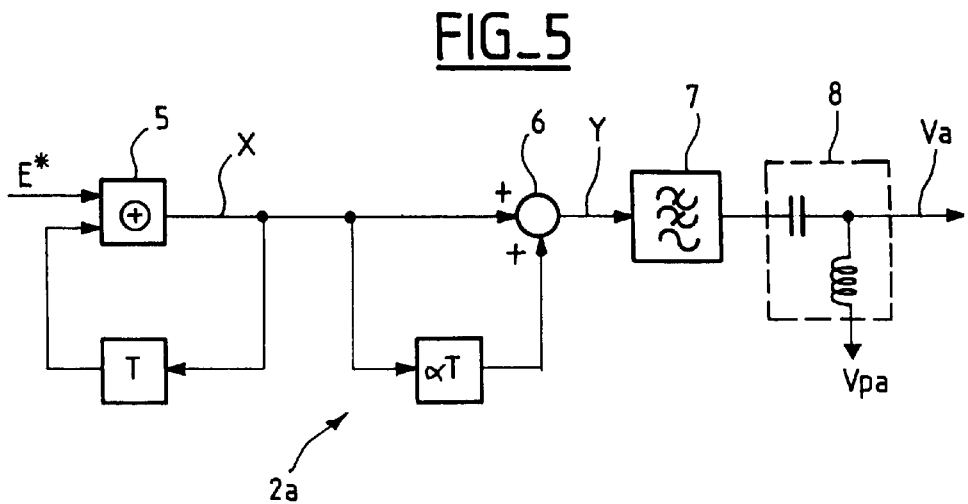
FIG_5

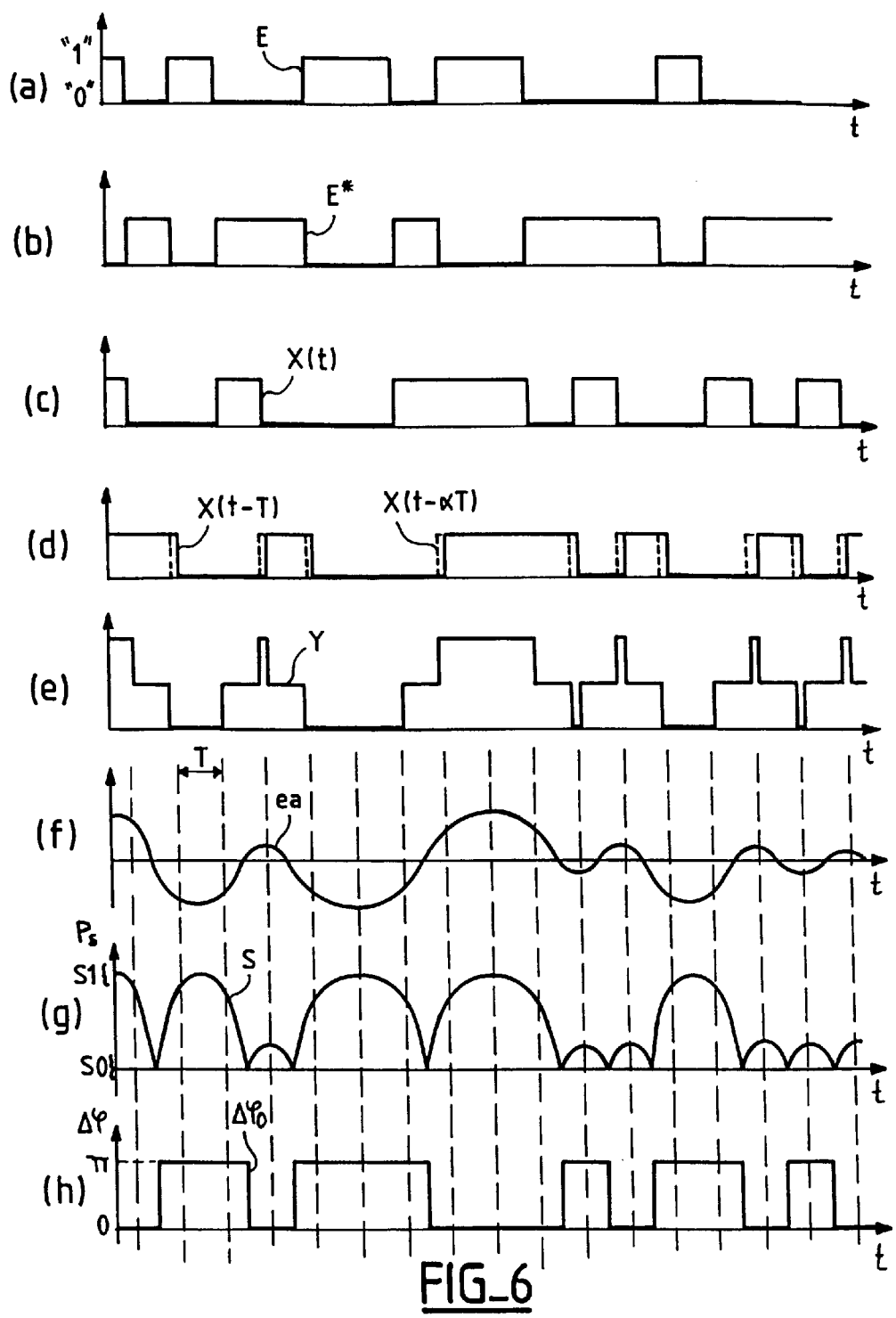
FIG_6

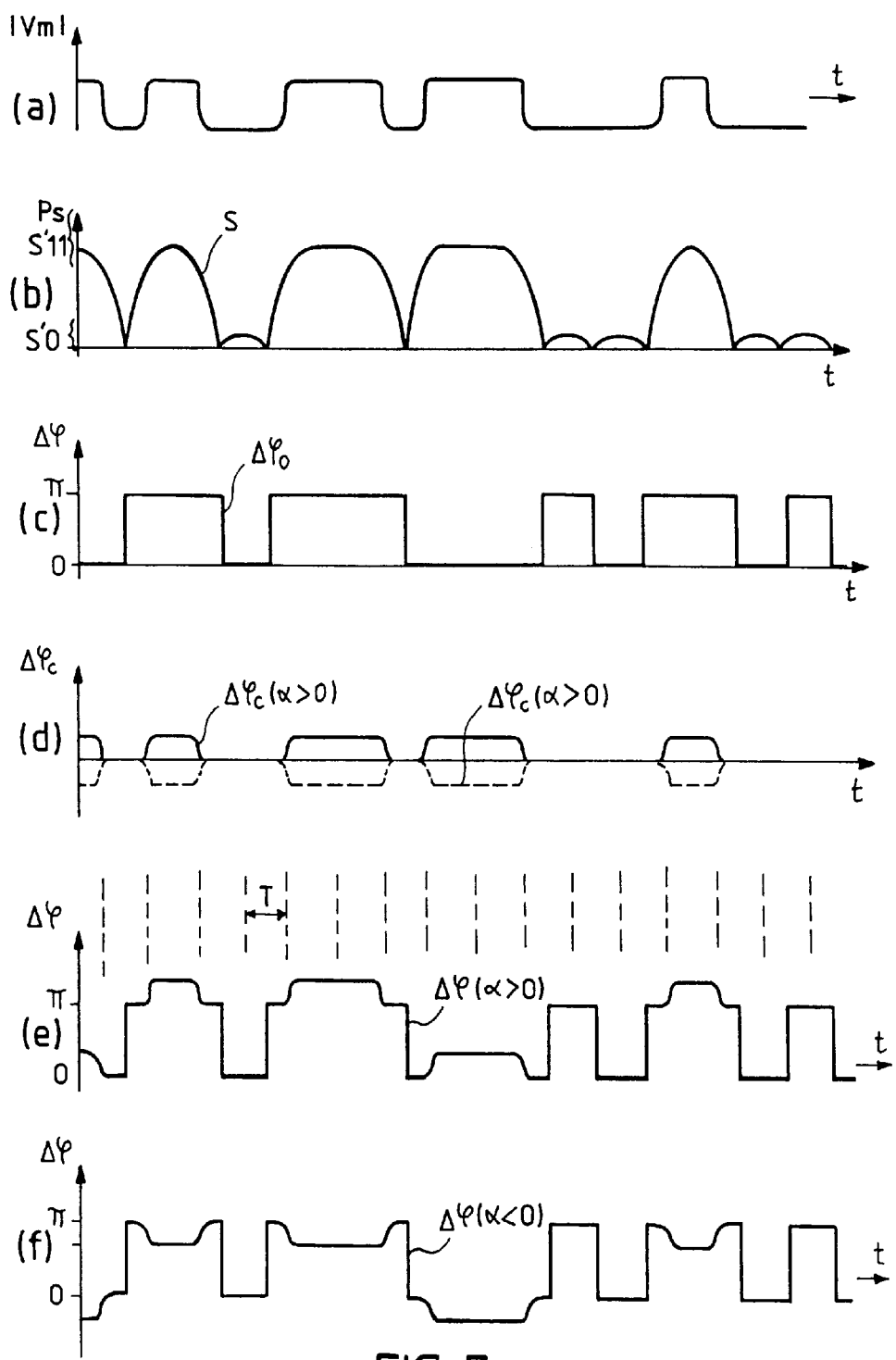
FIG_7

SYSTEM FOR TRANSMITTING OPTICAL DATA

The invention relates to the field of transmitting digital data by optical means. It is more particularly concerned with transmission at high bit rates on long-haul fiber optic links.

BACKGROUND OF THE INVENTION

Such transmission uses an optical transmitter connected to an optical receiver by the fiber. The transmitter generally modulates the power of an optical carrier wave from a laser oscillator as a function of the information to be transmitted. NRZ or RZ modulation is very frequently used and entails varying the power of the carrier wave between two levels: a low level corresponding to extinction of the wave and a high level corresponding to a maximum optical power. The variations of level are triggered at times imposed by a clock rate and this defines successive time cells allocated to the binary data to be transmitted. By convention, the low and high levels respectively represent the binary values "0" and "1".

The maximum transmission distance is generally limited by the ability of receivers to detect without error these two power levels after the modulated wave has propagated in the optical link. The usual way to increase this distance is to increase the ratio between the average optical power of the high levels and that of the low levels, this ratio defining the "extinction ratio" which is one of the characteristics of the modulation.

For a given distance and a given extinction ratio, the information bit rate is limited by chromatic dispersion generated in the fibers. This dispersion results from the effective index of the fiber depending on the wavelength of the wave transported, and it has the consequence that the width of the transmitted pulses increases as they propagate along the fiber.

This phenomenon is characterized by the dispersion coefficient D of the fiber, which is defined as a function of the propagation constant $\beta$ by the equation $D=-(2\pi c/\lambda^2)d^2\beta/d\omega^2$, where $\lambda$ and $\omega$ are respectively the wavelength and the angular frequency of the wave.

The value and sign of the dispersion coefficient D depend on the type of fiber and the transmission wavelength. For example, for the "standard" monomode fibers routinely used, and for $\lambda=1.55$ $\mu$m, the coefficient D is positive and has a value of 17 ps/(nm.km). In contrast, the coefficient D is zero for $\lambda=1.30$ $\mu$m. The coefficient D can generally be positive, zero or negative depending on the wavelength and the type of fiber used.

If the coefficient D has a non-zero value, to compensate the phenomenon of pulse widening in the case of NRZ or RZ modulation, it has already been proposed to modulate the phase $\phi$ (and therefore the frequency or the angular frequency) of the carrier wave in a manner that correlates to the modulation of the power. The phase $\phi$ corresponds to the convention whereby the electric field of the carrier wave is represented as a function of time t by a complex expression of the type: $A p \exp(j\omega_o t)$ and the field of a transmitted wave S of amplitude A is represented by: $S=A \exp[j(\omega_o t+\phi)]$, where $\omega_o$ is the angular frequency of the carrier wave and $\phi$ is the phase of the transmitted wave.

To be more precise, to compensate chromatic dispersion, and if the coefficient D is positive, the phase must decrease on the rising edges of the pulses and increase on their falling edges. The modulated wave is then said to feature a transient negative "chirp". If, in contrast, the coefficient D is negative, the phase modulation must be reversed and the transient "chirp" is positive.

A transient "chirp" parameter $\alpha$ is introduced to characterize this modulation, and is defined by the equation $\alpha=2P (d\phi/dt)/(dP/dt)$, where P is the power of the modulated wave and $\phi$ is its phase in radians.

For the previously mentioned standard fibers and for values of $\lambda$ close to 1.55 $\mu$m, for example, the value of the parameter $\alpha$ must be constant and substantially equal to -1 if by approximation $\alpha$ is regarded as constant.

Another approach proposes to reduce the bandwidth of the signal to be transmitted by appropriate encoding. One particular proposal is to use the "duobinary" code which is well-known in the field of electrical transmission. This code has the property of halving the bandwidth of the signal. According to the standard definition of this code, a signal is used with three levels respectively symbolized by 0, + and −. The binary value 0 is encoded by the level 0 and the value 1 is encoded either by the level + or by the level − with an encoding rule whereby the levels encoding two successive blocks of "1" around a respectively even or odd number of successive "0" are respectively identical or different.

Using the duobinary code for optical transmission is mentioned in the article "10 Gbit/s unrepeatered three-level optical transmission over 100 km of standard fiber", X.Gu et al., ELECTRONICS LETTERS, Dec. 9, 1993, Vol.29, No.25. According to the above article, the three levels 0, +, − respectively correspond to three levels of optical power.

French Patent Application No. 94 047 32, publication number FR-A-2 719 175, also describes application of duobinary encoding to the optical field. In the above document, binary "0" always corresponds to a low level of the optical power and the symbols + and − correspond to the same high optical power level and are distinguished by a 180° phase-shift of the optical carrier.

The use of that phase inverting duobinary code is also mentioned in the article "Optical duobinary transmission system with no receiver sensitivity degradation", K, Yonenaga et al., ELECTRONICS LETTERS, 16 Feb. 16, 1995, Vol.31, No.4.

In simulations and tests in which the experimental parameters were varied, it was found that an improvement is obtained provided that a phase shift of the carrier wave occurs within each "0" which precedes or succeeds each block of "1" or each isolated "1". The absolute value of the phase shift can be approximately 180°. Also, the average optical power of the low levels which encode "0" must have a value relative to that of the high levels sufficient to create intersymbol interference favorable to compensating chromatic dispersion. This amounts to saying that the extinction ratio must have a finite value.

The above observations have lead to the definition of a new optical transmission method known as Phase-Shaped Binary Transmission (PSBT). This method is described in European Patent Application EP-A-0 792 036 (Application No. 97400345.1), for example.

The PSBT process requires a transmitter capable of applying an absolute phase shift in the order of 180° to the carrier wave within each cell that corresponds to logic "0" and which precedes or succeeds any cell containing a logic "1".

A solution using a laser oscillator coupled to an electro-optical power modulator in turn coupled to an electro-optical phase modulator, for example, has the drawback of requiring complex and costly electronic control.

In reality, it is not at all inconvenient for the phase shifts to be effected systematically in each cell containing a logic "0". This leads to a simpler implementation using a "Mach-Zehnder" interferometer modulator. A modulator of this kind comprises an interferometer structure with an input optical guide that splits into two branches that are combined to form an output guide. Electrodes apply respective electric fields to the two branches. When the input optical guide receives a carrier wave of constant power, two partial waves propagate in the two branches and then interfere at the output. The output guide then supplies a wave whose power and phase depend on the values of the electrical control voltages applied to the electrodes. Phase shifts of approximately 180° can be produced at the times when the instantaneous power of the transmitted wave is zero.

To satisfy the conditions for PSBT modulation, the electrical control system must firstly feature amplitude modulation at three main levels as a function of the signal to be sent, in accordance with the duobinary code. It must also feature sustained oscillation at a low amplitude during consecutive sequences of "0". The electrodes must therefore be biased so that in the absence of modulation the DC components of the applied electrical voltages are such that the interference of the two partial waves is as destructive as possible.

If the modulated control signal is applied to only one of the electrodes and the other electrode receives a fixed bias voltage, the optical signal output by the modulator features a non-zero transient "chirp" which can be positive or negative, depending on the sequence of binary data encountered and whether the edge is a rising or falling edge.

One solution to the problem of eliminating that uncontrolled transient "chirp" is to use "push-pull" control applying a modulated voltage to one of the electrodes, as previously indicated, and a modulated voltage with the opposite phase to the other electrode.

Tests on standard fibers have shown that PSBT modulation achieves transmission distances much greater than those that can be attained with NRZ or RZ modulation. For example, a 10 Gbit/s signal can be transmitted 240 km, although the limit with NRZ modulation is only around 70 km.

However, implementations of PSBT modulators, especially those with an interferometer structure as mentioned above, do not always guarantee optimum transmission quality, regardless of their operating conditions.

For example, long-haul transoceanic transmission optical links include many amplifiers. The noise generated by the amplifiers then seriously degrades the extinction ratio. It is then useful to be able to adjust the extinction ratio at the transmitter end to give it an optimum value, i.e. a value high enough to allow for the amplifiers but low enough for intersymbol interference to compensate widening of the pulses due in particular to chromatic dispersion. An adjustment of this kind is difficult to implement in the control function of PSBT modulators, however.

Studies have shown that with PSBT modulation transmission distances can be increased by introducing a transient "chirp" whose sign and optimum value depend in particular on the dispersion coefficient D of the fiber, on the required transmission distance, and on non-linear effects (Kerr effect). As previously mentioned, the interferometer modulator solution cannot readily impose a transient "chirp" of given sign and value.

OBJECTS AND SUMMARY OF THE INVENTION

Also, the aim of the invention is to propose a transmission system which is more flexible to use and which is easier to optimize for each type of optical link and for each transmission distance.

To be more precise, the invention consists in a system for transmitting an optical signal in the form of an optical carrier wave modulated as a function of an input binary electrical signal, a clock rate defining successive time cells delimiting in the input signal first or second modulation levels, said device including a first electro-optical modulator adapted to respond to said input electrical signal by supplying a controlled phase optical signal having optical power modulated between low levels and high levels respectively corresponding to said first and second modulation levels of the input signal, and a phase shift within each time cell that contains a low power level and which precedes or succeeds a cell that contains a high power level, said system including a second electro-optical modulator controlled by said input signal and optically coupled to the first electro-optical modulator to apply complementary power and/or phase modulation to said controlled phase optical signal so as respectively to modify its extinction ratio and/or to apply a transient "chirp" to it.

To facilitate setting the modulation characteristics of the system, the first electro-optical modulator preferably does not apply any transient "chirp" to the controlled phase optical signal.

This latter condition can be met by using a "Mach-Zehnder" interferometer structure with "push-pull" control.

To be more precise, in this embodiment of the invention, the first electro-optical modulator includes:

a "Mach-Zehnder" interferometer structure wherein an input optical guide splits into two branches to guide two partial waves, said two branches combining again to form an output guide, respective electrodes being provided to apply electrical fields to said two branches, and a control circuit for applying to the electrodes respective control voltages having DC components between modulation components in phase opposition, said DC components being such that in the absence of modulation components said partial waves interfere destructively.

BRIEF DESCRIPTION OF THE DRAWINGS

Other aspects and advantages of the invention become apparent in the remainder of the description, which refers to the figures.

FIG. 1 shows variations in the sensitivity of a receiver as a function of propagation distance for various transient chirp values.

FIG. 2 shows a transmission system of the invention.

FIGS. 3 and 4 show characteristic curves of a "Mach-Zehnder" interferometer structure modulator.

FIG. 5 shows a control circuit of the interferometer modulator.

FIGS. 6 and 7 are timing diagrams explaining how the transmission system of the invention works.

MORE DETAILED DESCRIPTION

The curves in FIG. 1 represent the sensitivity s of a receiver as a function of the propagation distance d on standard fiber using PSBT modulation at 10 Gbit/s and for various transient "chirp" values. The curves are for links without amplifiers.

Sensitivity, which constitutes an indication of transmission quality, is here defined as the minimum value of the average received optical power (in dBm) to obtain a bit error rate of $10^{-9}$ at the receiving end.

Each curve corresponds to a transient "chirp" value here characterized by the value of the phase shift $\Delta\phi c$ introduced at each transition of the optical power level of the transmitted signal. For example, the thick continuous line curve corresponds to $\Delta\phi c=0$, i.e. to pure PSBT modulation.

Note in particular that a negative phase shift $\Delta\phi c$ in the range $-\pi/8$ to $-\pi/4$ is beneficial for transmission for distances less than 70 km while a positive phase shift in the range $+\pi/8$ to $+\pi/4$ is beneficial for transmission distances greater than 240 km.

For a typical noise level, a corresponding extinction ratio Tex can be associated with the sensitivity s, as shown in the figure, which shows that an extinction ratio of 7 dB is sufficient in practice.

Other measurements and simulations for long-haul transmission have shown how the extinction ratio influences the quality of the received signal. For example, for a 9000 km link with amplifiers every 30 km, a bit rate of 10 Gbit/s is possible with an extinction ratio of 13 dB. It is generally necessary to increase the extinction ratio as the distance between amplifiers increases and as the total distance of the link increases.

The limited amount of experimental data in the context of PSBT modulation shows the benefit of being able to adjust the extinction ratio easily and/or of being able to introduce a transient "chirp" of particular sign and value.

FIG. 2 shows one embodiment of a transmission system in accordance with the invention that allows such adjustments.

The device includes a first Mach-Zehnder electro-optical modulator consisting of an interferometer structure 1 and a first electronic control circuit 2. In a manner that is known per se, the structure can be formed on a lithium niobate ($LiNbO_3$) substrate. A structure with the same configuration on a substrate of III–V elements, such as indium phosphide InP, can be used instead. The structure 1 includes an entry guide Ge which splits into two branches Ba, Bb which then join again to form an output guide Gs. Respective electrodes Ka, Kb on the branches Ba, Bb receive voltages Va, Vb from the control circuit 2. A third electrode on the bottom face of the structure 1 is connected to earth.

The input guide Ge is connected to a second electro-optical modulator consisting of an opto-electronic component 3 controlled by a second electronic control circuit 4.

The component 3 of the second modulator receives a continuous wave L delivered by a laser oscillator, not shown, and supplies a modulated wave M to the structure 1 which delivers the output optical signal S via its output guide Gs.

The control circuits 2 and 4 receive the electrical input signal E and its complement E*.

The circuit 4 includes a switch SW for selectively applying the signal E or its complement E* to the input of an amplifier A. The amplifier is followed by a coupler for applying to the electrode of the component 3 a control voltage Vm having a modulation component that reproduces the modulation of the signal E or E*. The coupler also imposes on the control voltage Vm a DC component Vp which defines the bias of the component 3.

If the aim is merely to introduce a transient "chirp", the component 3 can be a prior art phase modulator. Its structure is identical to that of one branch of the interferometer structure 1, for example. The sign of the transient "chirp" is set by the position of the switch SW and its value can be chosen by adjusting the amplitude of the modulation of the control voltage Vm by adjusting the gain of the amplifier A.

If the extinction ratio needs to be adjusted, the component 3 is an optical power modulator such as an electro-absorption modulator or a modulator with a "Mach-Zehnder" interferometer structure similar to the structure 1. It is then possible to adjust the extinction ratio and also to introduce a transient "chirp" by varying the bias of the electro-absorption modulator or modulating the voltage of a single branch of the "Mach-Zehnder" structure.

The first electro-optical modulator 1, 2 applies pure PSBT modulation, i.e. without applying any transient "chirp". This means that "push-pull" control is required and, for this purpose, the control circuit 2 must apply to the electrodes Ka, Kb respective control voltages Va, Vb having DC components Vpa, Vpb between modulation components ea, eb in antiphase. Moreover, the DC components Vpa, Vpb are such that in the absence of the modulation components ea, eb the partial waves leaving the branches Ba, Bb interfere destructively in the output guide Gs.

Under the above conditions, the first modulator has the functional characteristics of FIGS. 3 and 4 which respectively represent the optical power Ps and the phase shift $\Delta\phi$ (modulo $2\pi$) of the signal S as a function of the modulation components ea, eb.

In one embodiment, the electronic control circuit 2 comprises two identical modules 2b, 2a respectively receiving the binary input electrical signal E and its complement E*.

FIG. 5 is a more detailed diagram of the circuit 2a. It includes a pre-coder comprising an exclusive-OR gate 5 whose inputs receive E* and the output signal X from the gate delayed by the bit time T of the input signal. An analog adder 6 receives the signal X and the same signal delayed by the amount $\alpha T$, where $\alpha$ is slightly less than 1. The adder 6 supplies the signal Y to a low-pass filter 7 whose output is connected to a coupler 8. The coupler 8 superposes the AC component of the signal from the filter on a bias voltage Vpa to form the control voltage Va applied to the electrode Ka. The voltage Vpa then constitutes the DC component of the control voltage Va.

How the FIG. 5 circuit works is now described with reference to timing diagrams (a) through (f) in FIG. 6. Timing diagram (a) shows an example of an NRZ type input electrical signal E. Timing diagrams (b) and (c) respectively show the complement E* of E and the signal X(t) from the precoder. Timing diagram (d) shows the signal X delayed by T: X(t-T) and $\alpha T$ : X(t-$\alpha t$). Timing diagram (e) shows the signal Y and timing diagram (f) shows the modulation component ea of the control voltage Va. Note that the time delay $\alpha t$ less than T maintains an undulation in the sequences of "0" of the signal ea, which is essential for PSBT modulation.

Circuit 2b is identical to circuit 2a but receives signal E and delivers a control voltage Vb whose modulation component eb has the opposite phase to ea.

If the wave M were not modulated, as is the case for pure PSBT modulation, the output optical signal S would have the power variations Ps and phase variations $\Delta\phi=\Delta\phi0$ shown in timing diagrams (g) and (h). Note that the optical power is modulated between low levels S0 and high levels S1 which respectively correspond to the two modulation levels of the input signal E. Also, a phase shift of substantially 180° occurs within each time cell (bit time T) which contains a low power level S0 and in particular which precedes or succeeds a cell which contains a high power level S1.

The effects of the second modulator 3, 4 are now explained with the aid of timing diagrams (a) through (f) in FIG. 7. Timing diagram (a) represents the absolute modulation of the control voltage of the component 3 and therefore reproduces the modulation of the signal E or its complement E*.

If the second modulator is an optical power modulator, the wave M has a modulated power and a signal S is obtained whose power Ps is modulated between low levels S'0 and high levels S'1 such that the extinction ratio is improved compared to pure PSBT modulation, as shown in timing diagram (b). On the other hand, the phase $\Delta\phi$ remains unchanged (timing diagrams (c)). If the second modulator is a phase modulator, the wave M has a modulated phase $\Delta\phi c$ corresponding to a positive or negative chirp $\alpha$, as shown in timing diagram (d) in continuous line and in dashed line, respectively. The phase $\Delta\phi$ of the signal S can then track the variations shown in timing diagrams (e) and (f), respectively.

What is claimed is:

1. A system for transmitting an optical signal in the form of an optical carrier wave modulated as a function of an input binary electrical signal, a clock rate defining successive time cells delimiting in the input signal first or second modulation levels, said system including a first electro-optical modulator adapted to respond to said input electrical signal by supplying a controlled phase optical signal having optical power modulated between low levels and high levels respectively corresponding to said first and second modulation levels of the input signal, and a phase shift within each time cell that contains a low power level and which precedes or succeeds a cell that contains a high power level, which system includes a second electro-optical modulator controlled by said input signal and optically coupled to the first electro-optical modulator to apply at least one of complementary power and phase modulation to said controlled phase optical signal so as to modify an extinction ratio of said controlled phase optical signal or to apply a transient chirp to said controlled phase optical signal, or both.

2. A transmission system according to claim 1, wherein said first electro-optical modulator does not apply any transient chirp to said controlled phase optical signal.

3. A transmission system according to claim 2, wherein said first electro-optical modulator includes:

a Mach-Zehnder interferometer structure wherein an input optical guide splits into two branches to guide two partial waves, said two branches combining again to form an output guide, respective electrodes being provided to apply electrical fields to said two branches, and a control circuit for applying to the electrodes respective control voltages having DC components between modulation components in phase opposition, said DC components being such that in the absence of modulation components said partial waves interfere destructively.

4. A transmission system according to claim 1, wherein said second electro-optical modulator is an electro-absorption modulator.

5. A transmission system according to claim 1, wherein said second electro-optical modulator is a Mach-Zehnder interferometer structure modulator.

6. A transmission system according to claim 1, wherein said second electro-optical modulator is an electro-absorption modulator biased to apply a non-zero chirp.

7. A transmission system according to claim 1, wherein said second electro-optical modulator is a Mach-Zehnder interferometer structure modulator biased to apply a non-zero chirp.

8. A system for transmitting an optical signal in the form of an optical carrier wave modulated as a function of an input binary electrical signal, a clock rate defining successive time cells delimiting in the input signal first or second modulation levels, said system including a first electro-optical modulator adapted to respond to said input view electrical signal by supplying a controlled phase optical signal having optical power modulated between low levels and high levels respectively corresponding to said first and second modulation levels of the input signal, and a phase shift within each time cell that contains a low power level and which precedes or succeeds a cell that contains a high power level, which system includes a second electro-optical modulator controlled by said input signal and optically coupled to the first electro-optical modulator to apply complementary power to said controlled phase optical signal so as to modify an extinction ratio of said controlled phase optical signal or to apply a transient chirp to said controlled phase optical signal, or both, wherein said second electro-optical modulator has a Mach-Zehnder interferometer structure.

9. A system for transmitting an optical signal in the form of an optical carrier wave modulated as a function of an input binary electrical signal, a clock rate defining successive time cells delimiting in the input signal first or second modulation levels, said system including a first electro-optical modulator adapted to respond to said input electrical signal by supplying a controlled phase optical signal having optical power modulated between low levels and high levels respectively corresponding to said first and second modulation levels of the input signal, and a phase shift within each time cell that contains a low power level and which precedes or succeeds a cell that contains a high power level, which system includes a second electro-optical modulator controlled by said input signal and optically coupled to the first electro-optical modulator to apply complementary phase modulation to said controlled phase optical signal so as to modify an extinction ratio of said controlled phase optical signal or to apply a transient chirp to said controlled phase optical signal, or both.

* * * * *